United States Patent
Qi et al.

(10) Patent No.: US 8,077,796 B2
(45) Date of Patent: Dec. 13, 2011

(54) METHODS AND ARRANGEMENTS FOR COMMUNICATING IN A MULTIPLE INPUT MULTIPLE OUTPUT SYSTEM

(75) Inventors: Xiao-Feng Qi, Westfield, NJ (US); Keith Holt, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1248 days.

(21) Appl. No.: 11/714,433

(22) Filed: Mar. 5, 2007

(65) Prior Publication Data

US 2008/0219376 A1  Sep. 11, 2008

(51) Int. Cl.
*H04B 15/00* (2006.01)

(52) U.S. Cl. ........ 375/285; 375/267; 375/278; 375/284; 375/313; 375/346; 455/63.1; 455/63.2; 455/63.3; 455/63.4; 455/65; 708/300; 708/301; 708/311; 708/314; 708/322

(58) Field of Classification Search .......... 375/285, 375/340, 341
See application file for complete search history.

(56) References Cited

U.S. PATENT DOCUMENTS

| | | | |
|---|---|---|---|
| 7,333,556 B2* | 2/2008 | Maltsev et al. | 375/295 |
| 7,684,507 B2* | 3/2010 | Levy | 375/267 |
| 2006/0008020 A1* | 1/2006 | Blankenship et al. | 375/261 |
| 2006/0098754 A1* | 5/2006 | Kim et al. | 375/267 |
| 2006/0133530 A1* | 6/2006 | Kwak et al. | 375/267 |
| 2008/0013610 A1* | 1/2008 | Varadarajan et al. | 375/221 |
| 2008/0108310 A1* | 5/2008 | Tong et al. | 455/69 |
| 2008/0112504 A1* | 5/2008 | Jiang et al. | 375/296 |
| 2010/0103920 A1* | 4/2010 | Damnjanovic et al. | 370/344 |
| 2011/0164700 A1* | 7/2011 | Porat et al. | 375/267 |

OTHER PUBLICATIONS

Jiang, Yi, et al., "Uniform Channel Decomposition for MIMO Communications", *IEEE Transactions on Signal Processing*, vol. 53. No. 11, (Nov. 2005).

* cited by examiner

*Primary Examiner* — Shuwang Liu
*Assistant Examiner* — Gina McKie
(74) *Attorney, Agent, or Firm* — Schubert Law Group PLLC (57) ABSTRACT

Systems and methods for utilizing new communication standards in wireless local area networks are provided that also support legacy wireless stations. The method can include user equipment determining channel state information, selecting a unitary channel decomposition precoder format based on the determined channel state information and transmitting the precoder format information to a base station. During a return transmission the user equipment can receive user data with the precoder format information and utilize a non-linear detector to demodulate and decode the user data. Based on the reception the user equipment can estimate channel quality; and transmitting channel quality information as feedback.

18 Claims, 3 Drawing Sheets

METHODS AND ARRANGEMENTS FOR COMMUNICATING IN A MULTIPLE INPUT MULTIPLE OUTPUT SYSTEM

FIELD

The present disclosure relates generally to wireless communications. More particularly, embodiments of the present disclosure are in the field of communications for multiple input, multiple output communication systems.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of embodiments of the disclosure depicted in the accompanying drawings. The embodiments are introduced in such detail as to clearly communicate the disclosure. However, the embodiment(s) presented herein are merely illustrative, and are not intended to limit the anticipated variations of such embodiments; on the contrary, the disclosure is to cover all modifications, equivalents, and alternatives falling within the spirit and scope of the appended claims. The detailed descriptions below are designed to make such embodiments obvious to those of ordinary skill in the art.

The consumer demand for wireless communication continues to grow. Consumers are demanding better coverage and higher reliability and quality of communication while current topologies are running near capacity. To address such a demand, new topologies in wireless technology particularly in the area of improved antenna radiation patterns have received considerable attention. One aspect of antennae patterns is called beam steering where a stronger signal can be sent or steered in the direction of the receiving device, while the signal is weakened in other directions where no receiving device exists. One way to steer wireless signals is to project multiple spatial streams utilizing multiple antennas. In a rich scattering environment, multiple transmit and receive antennas also improves the link throughput and/or robustness, by taking advantage of the fading diversity across the different transmit-receive antenna pairs, without increasing total transmit power or bandwidth. Such systems are commonly referred to as multiple input multiple output (MIMO) systems.

Multiple antenna systems can utilize a MIMO communication architecture. To facilitate steering digital signals in a digital transmission, the data to be transmitted can be precoded. Precoding can include placing the data to be transmitted in a matrix format. Mathematical functions can be performed on the matrix data to determine what signal is to be transmitted out of each antenna at what time such that the signal strength can be amplified in a particular direction. Thus, signals from the two antennas can be amplified in a particular direction as the signals add to each other in at least one direction and subtract in other directions creating lobes or beams and nulls in the antenna radiation pattern. This general principle is applicable to physical beams as well as virtual beams defined in terms of the eigen-directions of a channel matrix, such as in the case of a rich scattering environment where physical beams are ill-defined.

Thus, MIMO precoding is commonly utilized to prepare data for broadband wireless transmissions. Traditionally, such precoding was performed based on a singular value decomposition (SVD) method. Such a SVD based systems require a delicate data rate balancing scheme across spatial streams (i.e. lobes) to achieve the predetermined MIMO data transmission capacity. Such data preparation to achieve system balancing requires sophisticated circuits and/or software control collectively referred to as processing "overhead" by the transmitter. Further, sophisticated feedback or control features are often required to achieve the required performance sensitivity for systems that facilitate communications between mobile user devices. Also, the per-stream link adaptation process could be quite complicated. Further, many systems employ a finite set of quadrature amplitude modulation (QAM) constellations, and this type of system has losses in data throughput when disparate gains exists across the different spatial streams.

Fundamentally, SVD techniques aim to achieve complete channel orthogonality so that "simple" low cost linear minimum mean square error (MMSE) type detectors can be utilized at the receiver end. This is often viewed as an economical approach to system architecture because receivers other than MMSE type receivers have been stigmatized as expensive, unreliable and hence uneconomical. Channel orthogonality can be created utilizing spreading codes. Such codes can be considered as orthogonal if they sum to zero over a period of time. Orthogonal codes are desirable because such codes do not interfere with each other during transmission of data. Hence, this is another reason that traditional systems utilize low performance MMSE detectors in their receivers at the expense of requiring a complex per-stream rate control scheme in the base transmitters.

In accordance with the present disclosure, the tedious and complex per stream rate control of transmissions traditionally required for receivers having MMSE detectors can be greatly reduced when nonlinear detectors are utilized in receivers. It can be appreciated that non-linear detectors (e.g. successive interference cancellation (SIC) or maximum likelihood (ML) detections) that can reliably tolerate reasonably coupled channels can be quite sophisticated and thus, such non-linear detectors have been traditionally avoided due the cost benefit relationship of such a methodology. With advances in integrated circuit technology, non-linear detectors have become more practical for implementation into MIMO wireless systems.

In accordance with the present disclosure, advanced non-linear detectors can be utilized in receiver portions of a wireless device such that a simplified precoding hardware and a simplified precoding scheme can be utilized in the transmitter portion of the device. Such a methodology can provide increased bandwidth and a better quality of service in wireless communications for numerous reasons. Further, the disclosed "simplified" precoding scheme can provide improved capacity-achieving link adaptation. Such an adaptation feature allows the non-linear detectors to provide better immunity against inter-stream interference and channel mismatches.

The non-linear detectors of the disclosed system can achieve much improved closed-loop MIMO performance by neutralizing the ill effect of channel mismatch due to feedback delay. In one embodiment the disclosed MIMO system can utilize a cost-effective near-ML MIMO detector making effective use of the upper-triangular structure of the precoded effective channel.

In accordance with the present disclosure, a system is disclosed that integrates a unitary channel decomposition (UCD)-based precoder with a uniform modulation and coding scheme (MCS) link adaptation algorithm, to improve data throughput and decrease communication errors. Traditionally, UCD precoding work has aimed to optimize error performance for a fixed MCS without link adaptation. The combination between a UCD-based precoding with near-ML detectors that utilize QRD matrix decomposition to improved communication parameters provides for improved robustness for a coded orthogonal frequency division multiplexing MIMO system.

Figure 1:
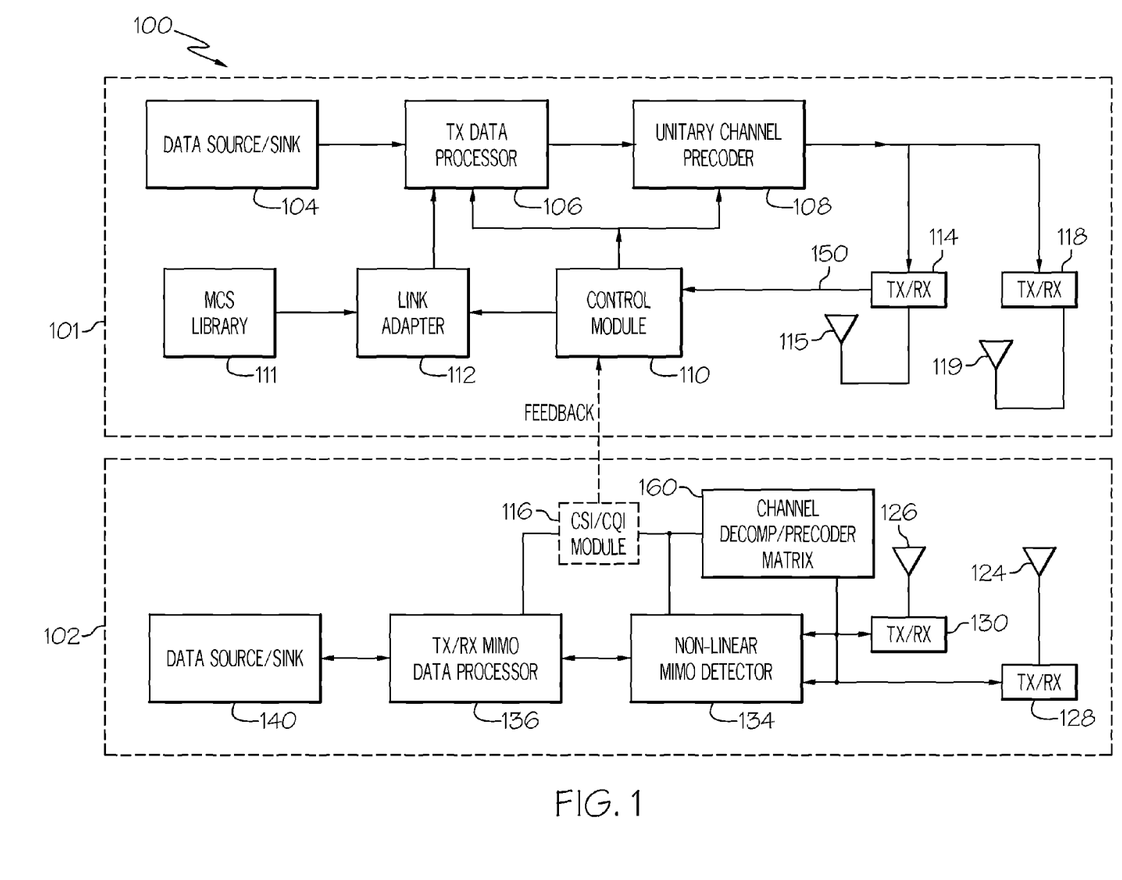
FIG. 1 depicts an embodiment of transmit side and a receive side in a wireless network.

Referring to FIG. 1, a multi-input multi-output (MIMO) system 100 is illustrated. The system can include transmitter components 101 and receiver components 102. For simplicity of discussion, transmitter components 101 and receiver components 102 have been depicted as separate systems however a typical device will have both transmit components 101 and receive components 102 such that the device can both transmit and receive data. More important, for a closed-loop MIMO system, the transmitter of a base station and the receiver of a mobile station can operate interactively to achieve the MIMO processing gain. The transmitter components 101 and the receiver components 102 can have multiple antennas 115, 119, 126 and 124 to facilitate transmitting and receiving using beam steering over multiple channels, thus creating a MIMO system.

Generally there can be two parties in a point-to-point communication link. Communication between these two parties would include four entities: a transmitter for a first party, a receiver for the first party, a transmitter for a second party, and a receiver for the second party. For a cellular telephone system, the first party could be referred to as a base station, and the second party could be referred to as user equipment. For a WLAN system the first party could be refereed to as an access point, and party could be referred to as a station or user equipment.

The transmitter components 101 can include a data source 104, a transmission (TX) data processor 106, a unitary channel precoder (UCP) 108, a link adapter a modulation and coding scheme (MCS) library 111 and a control module 110. The TX data processor 106 and the UCP 108 can accept control signals from the control module 110. The control module 110 can also receive feedback via the feedback line 150 and the communication link from the channel state information/channel quality indicator (CSI/CQI) module 116. The link adaptation module 112 under the control of the control module 110 can select modulation and coding schemes (MCS)s from the MCS library 111 based on the received channels state/channel quality information.

The control module 110 can also control the UCP 108 and the TX data processor 106 based on feedback from the receiver components 102 that can be processed and stored by the CSI/CQI module 116. The Link adapter 112 can also assist in controlling the TX data processor 106 by determining a MCS combination that improves channel qualities. Data that is prepared for transmission by the TX data processor 106 and the UCP 108 can be sent to the transceivers 114 and 118 which drive antennas 115 and 119. There are two quantities that can be obtained by the receiver, channel state information (CSI) and a channel quality indicator (CQI). Channel state information is basically gain values of the wireless channel, and this can be utilized to calculate the precoder matrix in the disclosed closed-loop MIMO system. Sometimes the precoder so derived can be referred to as "CSI" for convenience. The CQI is an indicator of how well the current MCS is performing. The CSI can be used to predict CQI, where the channel gain on any of the spatial channels can be used to select the MCS to be utilized by the transmitter. However, the CSI may not indicate how well the MCS in use is actually performing.

The CQI can be determined based on errors that occur in the received signal. The use of UCD as opposed to the traditional SVD can require the use of nonlinear detectors, which is generally more complex. The simple linear receiver that works well with SVD will not perform well with UCD. On the other hand, SVD does not allow the higher-performing non-linear detectors to realize their full potential. UCD can mandate nonlinear detectors that happen to have much better performance otherwise unrealizable in a traditional SVD-based system. Nonlinear detectors are more immune to channel mismatch. Channel mismatch can occur for example when the user is driving around in a car and by the time the transmitter applies the precoder derived from previous channel realizations, the channel has already changed and the precoder is no longer optimal for the present channel. Nonlinear detectors such as MLs are much less sensitive to channel mismatches than linear detectors.

The receiver components can include a data sink 140 a transceiver (TX/RX) MIMO data processor 136, a non-linear MIMO detector 135, a channel error estimation module 135, transceivers 128 and 130, CSI/CQI module 116 and multiple antennas illustrated as 126 and 124. In operation, the antennas 124 and 126 and transceivers 130 and 128 can receive multiple spatial signals and the non-linear MIMO detector 134 can process the signals and pass the demodulated signal to the MIMO data processor 136. The MIMO data processor 136 can provide the data contained in the transmission to the data sink 140. The MIMO data processor 136 can provide feedback via the channel estimation error module 135 to the non-linear detector 134 such that the non-linear detector 134 can adjust parameters to provide improved reception by the non-linear detector. Further, the receiver components 102 can send feedback data to the transmitter components 101 regarding the quality of the communication link and can report other communication link parameters to the transmitter components 101, more particularly to the channel state module and to the control module 110.

The MIMO system 100 illustrated can be implemented as a wireless local area network (WLAN) 100. However, the teachings herein could be utilized for near field communications (NFC)s, wireless municipal area network (WMAN), a mesh network, cellular type communications, WiMax, radio access network for radio termination equipment (RAN-LTE), fourth generation wireless (4G), and other types of wireless and wired communication networks. In the embodiment illustrated, wireless user devices and base stations are described however, this should not be considered as a limiting factor, as other types of devices, components and other types of network configurations could also utilize and benefit from the teachings herein.

The MIMO system 100 illustrated could serve to communicatively interconnect numerous devices with other devices in a wireless manner. The MIMO system 100 could be a computing or communication devices that is mobile and can be easily carried by a user. For example, components 101 and/or 102 could be part of a personal digital assistant (PDA), a mobile phone, a laptop computer, a desktop computer, tablet or handheld computer or another peripheral such as an ipod® a pocket video game, a pager, an "MP3" player and the like. The devices 101 and 102 could connect to the Internet, via the disclosed system when the system can communicate with a network (not shown).

Generally, the data processor 106 and the UCP 108 can have algorithms that can process the data from the data source to be transmitted, and then transmit the data via transceivers 114 and 118 out over two or more antennas 115 and 118. The information can be received by via multiple antennas (such as 124 and 126) of MIMO compatible devices. In traditional wireless systems, each device can be assigned time slots (a topology often called time division multiplexing) where the device can transmit and receive data during its time allocation and there is a single channel. Thus, multiplexing has been traditionally utilized but such single channel systems have inherent performance problems namely interference issues. In accordance with the present disclosure, the MIMO system 100 can provide additional communication pathways (spatial and frequency) and such parallel pathways allow more information to be exchanged between devices because of these additional "parallel" transmission pathways. Thus, multiple signals from multiple paths can be received by the non-linear detector 134 and the MIMO processor 136, processed and recombined on the receiving end.

In accordance with the present disclosure the transmitter components 101 can utilized a closed-loop MIMO system (or a system that utilizes feedback from the receiver components 102) and utilize non-SVD type precoding at the transmitter side. Precoding of data from the data source 104 can be defined as the process of preparing the signal for this directional transmission or beam steering. Such precoding can provide significant beam forming gain where the radiation pattern of transmitting antennas 114 and 119 can steer the directional intensity of signals towards the receiving antennas 124 and 126, and focus a signal of greater intensity towards receiving antennas 124, and 126. It can be appreciated that such transmit beamforming gain should be construed broadly to include that achievable by steering virtual beams in the eigen-space of the channel matrix, in addition to beam-steering in the physical space.

Such improved gain due to beam forming is superior to traditional open-loop systems (systems with little or no feedback) because the closed loop or feedback allows for the system to steer the beam until improved reception by the receiver components 102 occurs. Such improved reception can be determined by the receiver components 102 and signal strength etc can be fed back to the transmitter components 101.

Thus, the transmitter can continually make changes in transmission properties and detect via receiver feedback if the changes result in improvements to the communication in each communication channel. One such transmission property can be controlling the direction of the antennae pattern or changing the form of the beam. In a MIMO systems, beam forming can be defined as the process of delaying the outputs of one of the transmitting antennas in the antennae array (such as provided by antennas 116 and 120) such that the transmitted signals from each antenna 116 and 120 add together, to reinforce the signal strength in a particular direction. Such improved signal strength can be steered towards a particular spatial channel corresponding to the strongest eigenvalue of the channel matrix.

In accordance with one embodiment of the present disclosure, the disclosed system provides a shift in processing complexity from the transmitter components/side 101 of the system 100 to the receiving side/components 102 of the system 100 when compared to traditional systems. Such a shift can be achieved generally with a "non-SVD type" precoding module, herein referred to as a unitary channel precoding module (UCP) 108, the link adapter module 112 for the transmitter and the non linear detector 134 for the receiver.

The link adapter module 112 can assume a uniform modulation coding scheme (MCS) across all spatial streams. Such a MCS scheme can simplify the link adaptation scheme, and can rely on nonlinear detectors such as a maximum likelihood (ML) receiver or a successive interface cancellation (SIC) type receiver to demodulate the transmission at the receiving end. If the non-linear detector 134 is a ML type detector, it can utilize a channel noise probability distribution algorithm to optimize reception parameters. If the non-linear detector 134 utilizes a successive interface cancellation (SIC) type detector, a cancellation algorithm cancellation techniques can be utilized to achieve optimize reception parameters. Also channel error estimation techniques can be utilized by the data processor 136 and the non-linear detector 134 to achieve improved communication.

The precoding of data by the UCP 108 can be performed based on a uniform channel decomposition (UCD) technique that decomposes a MIMO channel into equal-gain sub channels in a "capacity-lossless" manner. As stated above, such equal-gain decomposition can eliminate the need for the delicate per-stream rate control required by traditional SVD-based systems. The equal gain decomposition can also allow the non-linear receiver 134 to be a ML and SIC type receiver or a hybrid thereof that has an inherent performance gain with respect to the traditional MMSE detectors.

Such a combination of components (i.e. a UCP 108, a link adapter 112 and a non-linear detector 134) can be configured such that they are compatible with the 3rd Generation Partnership Project (3GPP) Long Term Evolution (LTE) specifications. 3GPP is a global collaboration between many partners that aim to develop a globally accepted 3rd-generation mobile system communication. In one embodiment, the essential operations necessary for UCD resembles those typically used in the present-day Singular Value Decomposition (SVD) system. This embodiment would provide an incremental architectural evolution from traditional existing SVD-based solutions that do not rotate the antennae pattern or antenna beam.

In another embodiment the unitary precoder module 108 can code data for transmission utilize a MIMO orthogonal frequency division multiplexing (OFDM) configuration with per-sub carrier beam forming. More specifically, the unitary precoder module 108 can employ $N_T$ transmit antennas and $N_R \geq N_T$ receive antennas. To analyze such a configuration let H(k), k=1,K,N be the $N_R \times N_T$ channel matrices on the N sub carriers employed by the OFDM configuration. Referring to channel H on one particular sub carrier, the sub carrier index for notational convenience can be dropped. The rank of channel H can be assumed to be $N_T$, (i.e. $N_T$ non-vanishing spatial channels are available for MIMO transmission).

It can also be assumed that the noise components in the transmission across all receiving antennas 124 and 126 are independently and identically distributed. The UCD method can start with the SVD of H, i.e. $H=U\Lambda V^H$. Then the UCP 108 can optimize the data for a linear MMSE detector at the receiver utilizing a traditional water-filling solution, $F_{MMSE}=V\Phi^{1/2}$, where $\Phi$ is diagonal containing water-filling levels. The variable $F_{MMSE}=V\Phi^{1/2}$ is traditionally dropped in practice since the power loading gain is small at moderate-to-high signal to noise ratios (SNR)s.

It can be appreciated that the channel (i.e. the path (frequency, modulation, coding direction etc,) over which the electrical signal travels) can be completely decoupled by the SVD process. The non-linear detector 134, for example an ML detector, can withstand stronger channel correlations and provide improved performance over linear detectors but when complete decoupling occurs the non-linear detector may have decreased performance when compared to traditional linear receivers. Thus a hybrid MMSE-SIC configuration can provide enhanced performance. Due to the relatively high complexity of a ML type detector, a hybrid scheme combining traditional SIC and the so-called M-algorithm can be employed that achieves performance similar to that of full-ML detector.

The CSI/CQI module 116 can decompose the channel state information to arrive at a precoder which it can send back to the transmitter or the other party. The transmitter can utilize this precoder for its transmissions. The UCP 108, link adapter 112 and control module 110 can receive and utilize this channel state information from the CSI/CQI module 116 to select and produce an effective precoded channel configuration for transmitting data. In one embodiment a preceding configuration can be created where an equal-diagonal R matrix (when the matrix is decomposed into its Q and R components), has diagonal elements of the R matrix that are all equal to the geometric mean of the singular values of the channel matrix.

Precoding data to provide the equal-gain configuration (although not orthogonal) can provide a decomposition of the data that has demonstrated much improved error performance when such precoded data is received by a hybrid MMSE-SIC detector. Such an equal gain configuration can also provide near-optimal performance for ML detectors because both the hybrid detector and the ML detector are capable of canceling the off-diagonal interferences.

Specifically, the UCD precoder 108 can take the form $F_{UCD}=F_{SVD}\Omega$, where the $N_T \times L$ matrix $\Omega$ has orthogonal columns, and where the number of streams L may be chosen via rank adaptation whereby channel qualities under different numbers of spatial streams can be calculated and compared, and the MCS number providing the best quality is chosen. The number of streams will typically be greater than or equal to $\min(N_T, N_R)$. In laboratory simulations for a complete 3GPP LTE system comprising UCD precoder module 108 and a ML detector module as non-linear detector 134, the system has been shown to outperforms its traditional SVD counterpart with much reduced complexity for link adaptation Also, it can be appreciated that the complexity of implementing a UCD precoder technique is only moderately higher than that of performing SVD, with the additional precoding steps mainly involving "Givens Rotations" (a mathematical function) wherein off diagonal matrix elements are eliminated.

One extension of the UCD described, is to derive the precoder from the channel covariance matrix as opposed to the actual instantaneous channel itself, resulting in a novel application of UCD to eigen-beamforming, which is shown to significantly reduce feedback overhead associated with a closed-loop MIMO configuration described, especially in a time division duplex (TDD) system where such covariance matrices can be obtained via uplink reference signaling.

The feedback loop of transmit side, illustrated by line 150, and can include the receiver 102 sending channel quality information. Such feedback allows the control module 110 to determine if changes in transmission properties by the transmitter components 101 increases or decreases the efficiency of the communication channel. The system 100 can employ a channel quality indicator (CQI) configuration that can be embodied in various forms. In addition, due to uniform modulation coding schemes (MCS), CQI feedback for link adaptation can be reduced as compared to the SVD-based approach.

The feedback loop of transmit side, illustrated by line 150, and can include the receiver 102 sending channel state information to the control module 110. In one embodiment, a codebook can be chosen to quantize either the preceding matrix or to increment the matrix over time. Both approaches can reduce the feedback overhead as compared to sending the actual channel gain values. It can be appreciated that for the incremental feedback approach, some pilot transmissions can be precoded, sent, and received to estimate the effective channel.

In one embodiment, a uniform MCS link adaptation technique can be utilized to continuously determine improved communication processing formats. The equal-gain characteristic described herein can allow the selection of a single modulation and coding scheme (MCS) across all the spatial streams. Link adaptation module 112 can then pick a single MCS that maximizes data throughput, subject to maintaining a predetermined quality of service (QoS) parameter. The link adaptation module 112 can utilize a packet-wise channel quality indicator input (such as mean instantaneous capacity averaged over all the concerned sub carriers) to continuously modify the MCS format until an acceptable performance metrics are achieved.

The adaptation module 112 can chose a MCS from a lookup table and the MCS could be generated off-line using the UCD preceding and a nonlinear detector of choice such as a vertical Bell Labs layered space-time (V-BLAST) detector or a ML detector. For mutual information based link adaptation, the scalar sub channel gain alone can be sufficient to calculate a channel quality indicator, reducing computational complexity when such CQI's are calculated for all sub carriers.

As stated above, in one embodiment a non-linear ML detector can be utilized to receive UCD-precoded data, whereby an estimate of the UCD-precoded channel matrix can be utilized for ML detection and the detected symbols can be further used for a data-driven channel and interference estimation, (if desired). Such an embodiment can enhance performance in a mobile environment because such a system can accommodate channel mismatches in a robust fashion, and produce a worst-case performance equal to that of an open-loop ML system in such a high mobility environment.

Furthermore, virtually all practical sub-optimal implementations of a ML detector involve a QRD decomposition of the effective channel matrix (e.g. sphere detector, QRD-M, etc.), and suffer from over-design aimed to counter performance sensitivity over uneven spatial sub channel gains. The UCD provided by the UCP 108 can make all sub channel gains the same, therefore such a configuration can be a natural precoder for such quasi-ML detectors.

Also, it can be appreciated that although the traditional UCD process that can be provided by the UCP 108 was optimized for a MMSE-VBLAST type of detector, ML type detectors can possibly provide improved performance in such a configuration. A ML type detector will likely achieve improved performance over any practical precoder since known ML-tailored precoders usually incur prohibitive cost for practical implementation and lack certain desirable properties (e.g. being unitary).

Typical error performance for a UCD-preceded 3GPP LTE compliant downlink employing two spatial streams and a ML type detector is well within specification for current systems. Where such a specification and system parameters can be adopted from the 3GPP LTE specification. To match realistic constraints on feedback overhead, a preceding matrix can be fed back every 25 sub carriers, with feedback latency of 10 sub frames, and a feedback frequency of once every 10 sub frames. The UCD-precoded can utilize 4×2 matrix/system and can out-perform an open-loop 2×2 system by approximately 5 dB. The gain will grow to approximately 6 dB when no such constraints are imposed. Such an improvement in error performance was observed to carry over to throughput performance where a channel quality indicator based on mutual information was adopted, resulting in throughput similar to that of SVD-based precoding.

In contrast to SVD-based precoding, the UCD-based precoder 108 can provide uniform MCS across all spatial streams. Such uniformity can significantly simplify fast link adaptation allowing for reduced complexity in the CQI algorithm used at the receiver 102 for MCS selection. A reduced number of raw bits can thus be utilized for the CQI feedback, either reducing feedback overhead or improving feedback fidelity. It can be appreciated that such a reduced bandwidth is important especially for frequency division duplex (FDD) type system.

In contrast to SVD-based precoding, the UCD-based precoder 108 can reduce the throughput loss due to finite constellation size in a highly spatially correlated channel. This is particularly true where a SVD-based precoder may try higher constellation sizes for strong streams that are not provided by the standard. The UCD-based precoder 108 can attempt constellation sizes that match the average channel gain, and such sizes are less likely to go out of bound or run afoul of the 3GPP LTE specification.

The disclosed UCD-based closed-loop MIMO system has been confirmed to be more robust in high mobility environment, as the common gain over all the spatial streams is the geometric mean of the singular values of the channel matrix. Such a configuration can be inherently more stable over time than the mean of individual singular values.

It can be appreciated that a preceding scheme that is optimized for high-performance detectors such as ML detectors enables maximum design re-use. ML type detectors can be utilized in the open-loop MIMO systems and provide significant performance gain over MMSE type of detectors, therefore this disclosure extracts an additional performance gain utilizing a closed-loop system. SVD-based precoders do not allow for such performance improvements, while the UCD-based precoder 108 provides such improvements.

Further, the UCD-based precoder 108 also enables robust performance for quasi-ML detectors at the receiver. Such detectors are typically designed for the worst-case channel conditions, due to their sensitivity to uneven gains across spatial streams. The UCD-based precoder 108 can equalize these gains, and can lead to lower costs more robust designs with a quasi-ML detector that approaches ML performance that is found in sphere detectors and QRD-M detectors.

The preceding scheme of the UCD 108 can impact the entire protocol of a closed-loop MIMO system as it requires cooperative interaction between both ends of a link (i.e. the transmitter 101 and the receiver 102. As a result, there are considerable modifications to the disclosed embodiments with respect to different precoding schemes wherein such changes would not part from the scope to the disclosure. In addition such precoding techniques could be utilized by future 3GPP LTE or future WiMax-2 compatible devices.

The precoding scheme provided by UCD 108 provides many improvements over traditional systems because it specifically addresses some of the more problematic aspects in applying precoding to mobile broadband wireless systems, particularly for link adaptation. The UCD 108 can utilize a linear unitary preceding with moderate additional computational overhead as compared with a SVD-based precoding scheme (mostly additional Givens Rotations). Thus, the disclosed techniques allows for a smooth evolution for the current architecture of the Institute of Electronic and Electrical Engineers (IEEE) 802.11n specification for product architecture regarding SVD.

The process of feeding back codewords to the transmitter representing incremental changes of the UCD precoding matrix provides many system enhancements. In the past such communication feedback schemes have typically been suggested exclusively for SVD-based preceding however not to unitary decoding. The extension of UCD to precoding based on long-term $2^{nd}$ order channel statistics (especially for TDD system) also provides system enhancements. Since UCD decomposes an augmented channel matrix that contains $2^{nd}$ order statistics of combined interference and noise, and it is feasible to collect such statistics in many application scenarios, precoding combined with link adaptation enables a new scheme that enables "interference-aware" transmit beam forming and link adaptation that is expected to improve cellular system performance in interference-limited applications.

Figure 2:
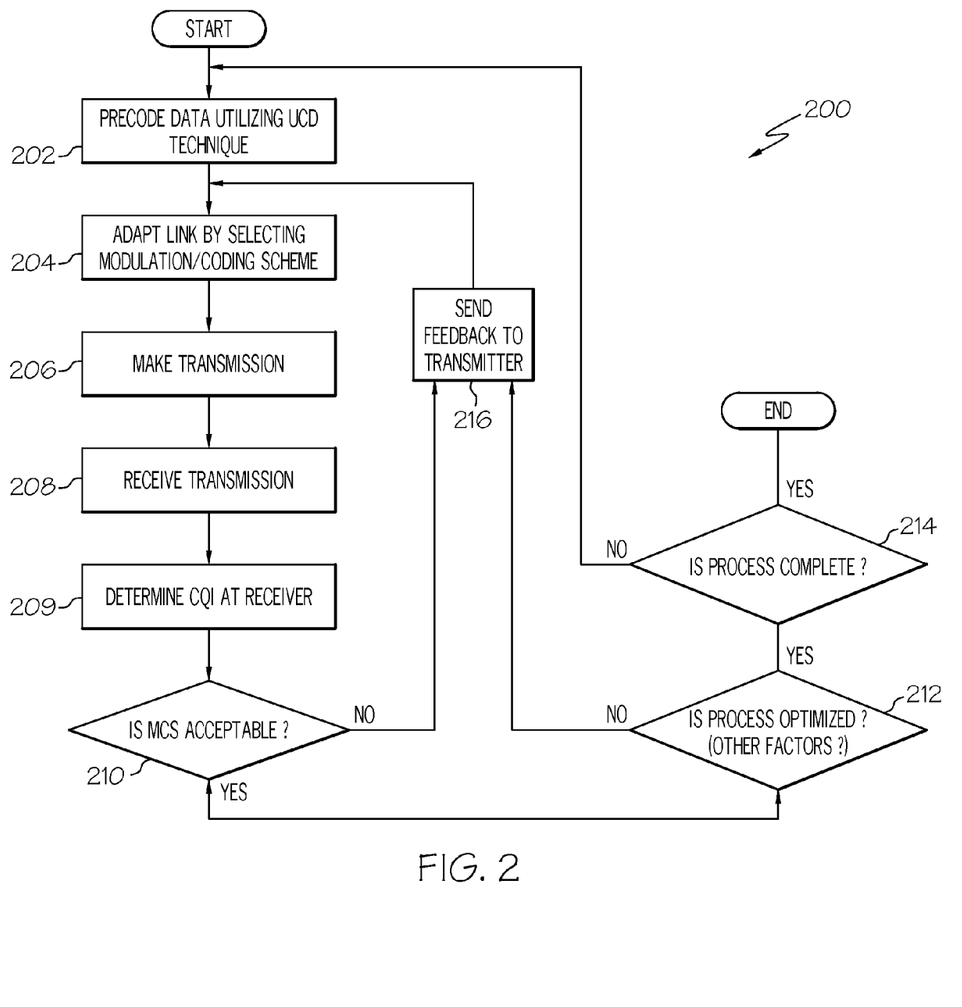
FIG. 2 is a flow diagram of a method for facilitating wireless network communications.

Referring to FIG. 2, a flow diagram 200 for a communication system is illustrated. As illustrated by block 202, data from a data source can be precoded utilizing a uniform composition technique. As illustrated by block 204, the communication link can be adapted by selecting a modulation coding scheme (MCS). The transmitter can make a transmission, as illustrated by block 206. A receiver can receive the transmission, as illustrated by block 208. Channel state information can be determined at the receiver as illustrated at block 208.

Referring to FIG. 2, a flow diagram 200 for a communication system is illustrated. As illustrated by block 202, data from a data source can be precoded utilizing a uniform composition technique. As illustrated by block 204, the communication link can be adapted by selecting a modulation coding scheme (MCS). The transmitter can make a transmission, as illustrated by block 206. A receiver can receive the transmission, as illustrated by block 208. Channel state information can be determined at the receiver as illustrated at block 209.

In decision block 210, if the channel quality information is acceptable other parameters can be analyzed and it can be determined if these factors of the communication process are optimized in decision block 212. If other parameters can be optimized such information can be sent back to the transmitter as illustrated in block 216 to improve the communication link. If the process is optimized, then at decision block 214 it can be determined if the transmission is complete. If the transmission is not complete then the process can revert to block 202 where data can be precoded. If the transmission is complete the process can end.

Figure 3:
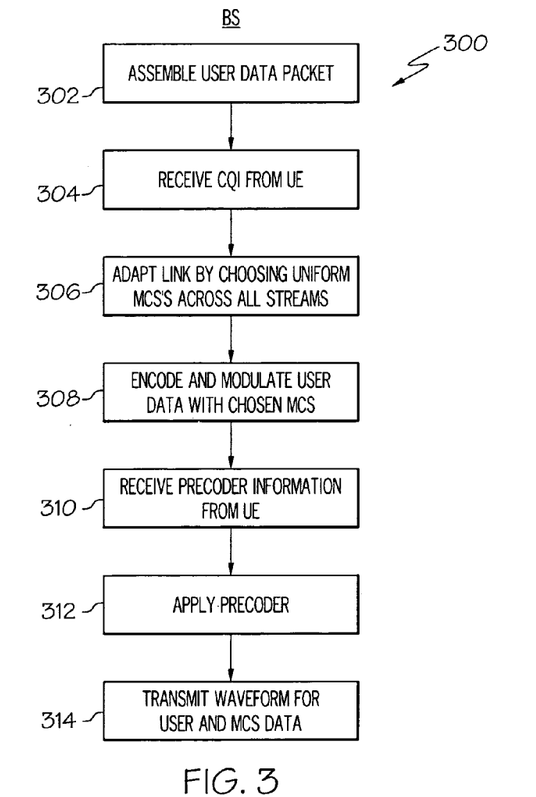
FIG. 3 is a flow diagram of a method for operating a base unit.

Referring to FIG. 3, a flow diagram 300 for a base station is disclosed. As illustrated by block 302 the base station can assemble a user data packet. As illustrated by block 304, the base station can receive a channel quality indicator from the receiving equipment. As illustrated in block 306, the communication link can be adapted by choosing a uniform modulation control scheme across all spatial streams. The user data can be encoded and modulated utilizing the selected MCS, as illustrated by block 308.

As illustrated by block 310, the base station can receive precoder information (via CSI feedback) from the receiving end user equipment. The base station can apply the precoder information to the data to be transmitted, as illustrated in block 312 and the base station can transmit a waveform containing the user data and MCS data as illustrated by block 314. The process can end thereafter.

Figure 4:
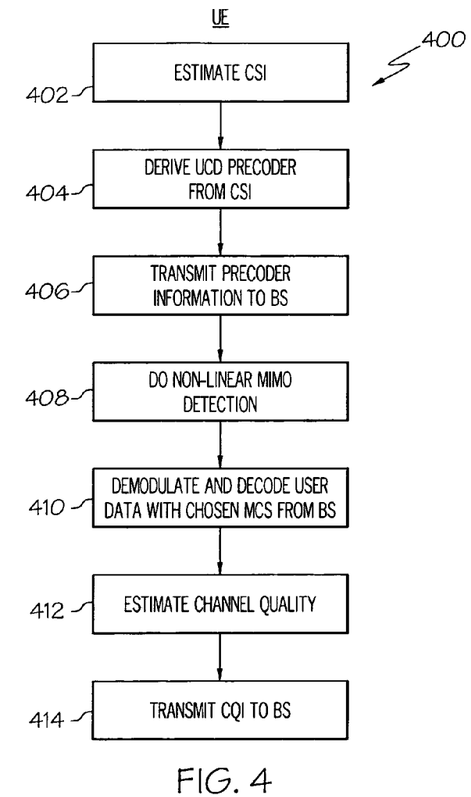
FIG. 4 is a flow diagram of a method for operating user equipment.

Referring to FIG. 4, a flow diagram 400 for user equipment is disclosed. As illustrated by block 402, the user equipment can estimate channel state information by aid of processing received signal resulting from predetermined training signals known to the user equipment. The user equipment can derive unitary channel decomposition (UCD) precoder information based on the estimated channel state information as illustrated by block 404. As illustrated by block 406, the user equipment can transmit the precoder information to the base station. During a return transmission the user equipment can perform non-linear MIMO detection as illustrated by block 408. The user equipment can then demodulate and decode the transmission from the base station utilizing the selected MCS from the base station. The user equipment can estimate the channel quality as illustrated by block 412 and then transmit the continuous quality indicator (CQI) to the base station as illustrated by block 414. The process can end thereafter.

Such a process can attempt to optimize the performance of each communication link between the access point and each station. Generally, a station can increase the rate at which it communicates by changing the modulation and the coding rates. The optimization process can attempt to optimize a quality of service (QoS) parameter. Such an optimization process offers advantages in building the support for "bandwidth-hungry" applications and time-critical services like VoIP, wireless multimedia, and mesh networks.

Another embodiment of the disclosure is implemented as a program product for implementing a legacy compliant WLAN with the systems and methods described with reference to FIGS. 1-4. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present disclosure.

In general, the routines executed to implement the embodiments of the disclosure, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the disclosure should not be limited to use solely in any specific application identified and/or implied by such nomenclature.

The present disclosure and some of its features have been described in detail for some embodiments. It should be understood that various changes, substitutions and alterations can be made herein without departing from the spirit and scope of the disclosure as defined by the appended claims. An embodiment of the disclosure may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method of wireless transmission via more than one spatial stream comprising;
assembling a data packet to be transmitted from a base station via a communication link to a receiving device;
receiving, at the base station, channel quality information associated with the communication link;
selecting a single modulation and coding scheme for the more than one spatial stream based on the channel quality information to maximize throughput across the more than one spatial stream through the communication link;
encoding and modulating the data packet based on the single modulation and coding scheme;
precoding the data packet utilizing precoder information selected based upon channel state information and received from the receiving device to decompose the data packet via non-orthogonal, equal gain, decomposition into equal gain subchannels for transmission through the communication link; and
transmitting the precoded data packet through the communication link.

2. The method of claim 1, wherein precoding comprises utilizing an equal-diagonal R matrix that is a matrix decomposed into Q and R components, and the diagonal elements of the R matrix are all equal to the geometric mean of the singular values of a properly augmented channel matrix.

3. The method of claim 1, further comprising selecting the single modulation and coding scheme that improves data throughput, subject to maintaining a predetermined quality of service.

4. The method of claim 1, further comprising canceling off-diagonal interferences.

5. The method of claim 1, wherein uniform channel decomposition is applied to a channel covariance matrix, to provide uniform channel decomposition eigen-beamforming.

6. The method of claim 1, wherein transmitting comprises the base station estimating a channel covariance matrix based on receptions, performing uniform channel decomposition and precoding a downlink transmission.

7. The method of claim 1 further comprising estimating channel covariance matrices, performing uniform decomposition and sending the resultant precoder information back to the base station.

8. The method of claim 1, wherein the channel quality information includes a calculation of a mean instantaneous capacity averaged over all subcarriers utilized.

9. The method of claim 1, further comprising modifying the single modulation and coding scheme until a predetermined performance metric is achieved.

10. The method of claim 1, further comprising utilizing scalar subchannel gain to determine a channel quality indicator.

11. The method of claim 1, wherein the precoder information provides subchannel gains for each channel, the subchannel gains being substantially the same such that a quasi-ML detector can receive the user data.

12. The method of claim 1, wherein transmitting the data packet comprises transmitting the data packet to a detector that utilizes a QRD matrix decomposition in coded orthogonal frequency division multiplexing based communications.

13. The method of claim 1, wherein receiving precoder information comprises receiving codewords representing incremental changes of a unitary channel decomposition precoding matrix.

14. A communication system to communicate via more than one spatial stream comprising;
 a modulation and coding scheme library comprising more than one modulation and coding scheme;
 a control module to receive a channel quality indicator associated with a communication link;
 a link adapter coupled with the control module and with the modulation and coding scheme library to select a single modulation and coding scheme based on the channel quality indicator from the more than one modulation and coding scheme for the more than one spatial stream to improve throughput across the more than one spatial stream;
 a transmission processor for transmitting a data packet through the communication link; and
 a uniform channel precoder to receive precoder information derived from channel state information associated with the communication link;
 wherein the control module is coupled with the uniform channel precoder and coupled with the transmission processor to encode and modulate the data packet based on the single modulation and coding scheme and to precode the data packet responsive to the single modulation and coding scheme utilizing the precoder information to decompose the data packet via non-orthogonal, equal gain, decomposition into equal gain subchannels for transmission through the communication link.

15. The system of claim 14, further comprising a non-linear detector to receive the precoded data packet.

16. The system of claim 15, further comprising a non-linear detector comprising one of a maximum likelihood (ML) detector, a successive interface cancellation (SIC) detector or a hybrid minimum mean square error SIC (MMSE-SIC) type detector.

17. The system of claim 14, further comprising a channel state module to provide channel state information to the link adapter wherein the link adapter selects a modulation and coding scheme in response to the channel state information.

18. The system of claim 14, further comprising a channel quality indicator module to provide the channel quality indicator to the link adapter.

* * * * *